United States Patent [19]
McCarty et al.

[11] Patent Number: 5,236,136
[45] Date of Patent: Aug. 17, 1993

[54] SYSTEM AND METHOD FOR RECYCLING USED OIL FILTERS

[75] Inventors: Michael W. McCarty, 3610 Faulkner Dr., Rowlett, Tex. 75088; James M. Taylor, Grand Prairie; Lloyd A. Baillie, Plano, both of Tex.

[73] Assignee: Michael W. McCarty, Dallas, Tex.

[21] Appl. No.: 810,875

[22] Filed: Dec. 20, 1991

[51] Int. Cl.⁵ .................... B02C 23/14; B30B 9/02
[52] U.S. Cl. ..................... 241/24; 241/79.1; 241/101.2; 241/DIG. 38; 100/37; 100/91; 100/96; 100/110; 100/131; 209/219; 209/248; 209/691; 209/930
[58] Field of Search ............... 241/24, 79.1, 99, 101.2, 241/DIG. 38; 209/38, 219, 248, 250, 655, 675, 691, 930; 100/37, 91, 96, 110, 125, 131, 902

[56] References Cited

U.S. PATENT DOCUMENTS

| | | | |
|---|---|---|---|
| 3,892,658 | 7/1975 | Benowitz | 241/DIG. 38 X |
| 4,036,441 | 7/1977 | Basten et al. | 241/DIG. 38 X |
| 4,102,263 | 7/1978 | Forsberg | 241/99 X |
| 4,459,206 | 7/1984 | Laithwaite | 241/79.1 X |
| 4,483,248 | 11/1984 | Ostreng | 100/91 X |
| 4,778,116 | 10/1988 | Mayberry | 209/38 X |
| 4,831,940 | 5/1989 | Franza | 209/38 X |
| 4,917,310 | 4/1990 | Carrera | 241/32 |
| 4,927,085 | 5/1990 | Oberg | 241/36 |
| 5,001,911 | 3/1991 | Eck et al. | 100/125 X |
| 5,041,211 | 8/1991 | Koszalka | 241/24 X |
| 5,060,564 | 10/1991 | Buford et al. | 100/52 |
| 5,135,176 | 8/1992 | Barber | 241/24 X |
| 5,165,334 | 11/1992 | Aluotto et al. | 100/902 X |
| 5,167,184 | 12/1992 | Rebecchi | 209/38 X |

*Primary Examiner*—Frank T. Yost
*Assistant Examiner*—Clark F. Dexter
*Attorney, Agent, or Firm*—Ross, Howison, Clapp & Korn

[57] ABSTRACT

A system and method for recycling used oil filters by shredding the filters to facilitate separation of the metal and nonmetal filter components and to release free oil trapped inside the filters, separating the metal and nonmetal filter components using combined magnetic and gravitational means, compressing the nonmetal filter components, and recovering the oil therefrom.

5 Claims, 1 Drawing Sheet

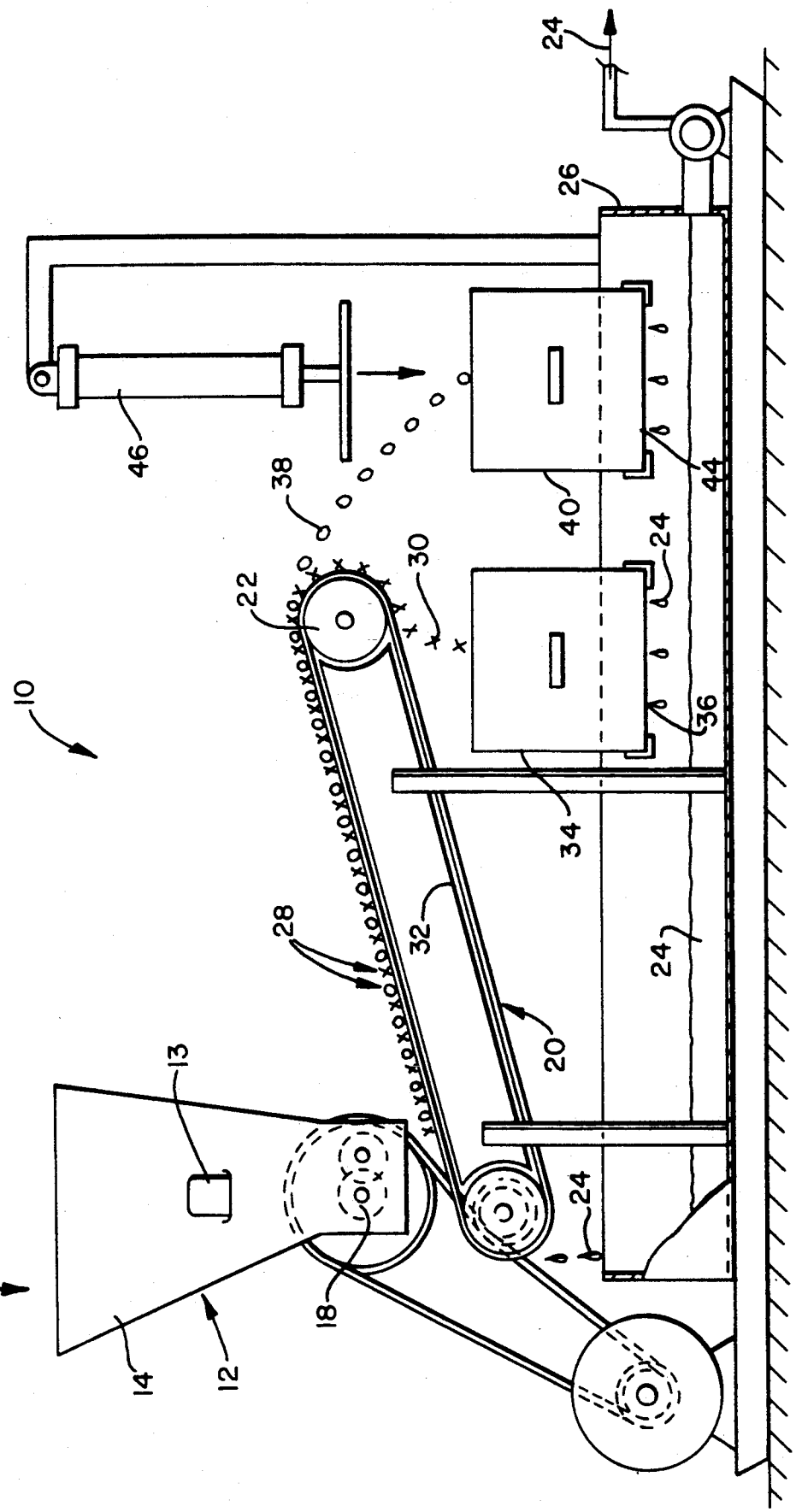

SYSTEM AND METHOD FOR RECYCLING USED OIL FILTERS

BACKGROUND OF THE INVENTION

This invention relates to used motor oil filters, and more particularly, to a system and method for recycling used "spin-on" motor oil filters in an environmentally acceptable manner in which all components of the used oil filters are recovered for reuse in other products.

In the past, used oil filters removed from internal combustion engines during oil changes have typically been disposed of by dumping them into landfills. Such oil filters generally comprise a substantially cylindrical canister (made of steel or another ferrous metal) having a filter element (usually comprising corrugated and/or multilayered cellulosic or other absorptive material) disposed inside the canister and an annular rubber gasket disposed on one face of the canister for sealing engagement with an engine block.

During engine operation, motor oil is circulated by an oil pump from the crankcase, through the filter element and back into the engine. After the engine has been operated for a period of time that can vary depending upon conditions of use, the filter element becomes plugged with waste matter filtered from the oil, and the oil rapidly becomes dirty, necessitating an oil change and replacement of the filter.

Because the filter elements of used oil filters are saturated with oil, other hydrocarbons and lesser quantities of various byproducts of combustion and engine wear, dumping them into a landfill can contribute to groundwater contamination as those materials leach out of the steel canisters with the passage of time. Stockpiling the used filters likewise creates both fire and environmental hazards due to the residual oil trapped in the filters and the oil that leaks out into the ground and underlying water table. Incineration, an alternative method of disposing of the used oil filters, is expensive, requires considerable energy consumption, and produces other byproducts harmful to the environment.

Recently, many states have either implemented or are considering the implementation of laws and regulations controlling the disposal of used oil filters and prohibiting dumping of the filters into landfills. For this reason, a system and method for recycling used oil filters in an environmentally acceptable manner, and preferably into other useful products, are needed.

SUMMARY OF THE INVENTION

According to the present invention, a system and method are provided for recycling used oil filters into raw materials for other useful products in an efficient and environmentally acceptable manner. Use of the invention disclosed herein will enable all components of the used oil filters to be recovered and classified for further processing and/or for use as feedstocks in other manufacturing operations.

According to one preferred embodiment of the invention, a system is provided that comprises means for collecting and temporarily storing used oil filters, means for shredding the filters into pieces small enough to facilitate separation of the metal component from the filter element and gasket components, means for magnetically separating the ferrous metal component from the filter element and gasket components, means for compressing the shredded filter element and gasket components, and means for recovering used motor oil drained or released from the shredded oil filters or expressed from the compressed filter element and gasket material. According to a particularly preferred embodiment of the invention, a belt conveyor having a magnetic head pulley is utilized in separating the ferrous metal component of the shredded oil filters from the filter element and gasket components.

According to another preferred embodiment of the invention, a method for recycling used oil filters is provided that comprises the steps of collecting and shredding the filters into pieces small enough to facilitate separation of the metal and nonmetal components, separating the metal and nonmetal components using combined magnetic and gravitational means, compressing the nonmetal components to express oil therefrom, and recovering the oil drained or expressed from the metal and nonmetal components. According to a particularly preferred embodiment of the invention, the nonmetal components are compressed into bales.

BRIEF DESCRIPTION OF THE DRAWING

The system and method of the invention are further described and explained in relation to FIG. 1, which depicts in simplified schematic form the structure and relative placement of apparatus preferred for use in practicing the subject invention.

DESCRIPTION OF THE PREFERRED EMBODIMENTS

Referring to FIG. 1, system 10 of the invention preferably comprises a shredding means 12 capable of shredding used oil filters 13 into pieces small enough to facilitate separation of the metal and nonmetal components according to the method disclosed herein. The metal components of oil filters 13 typically comprise a canister made of steel or other ferrous metal, together with a threaded inlet port adapted to threadedly engage an engine block, a gasket seating surface, and a perforated screen member surrounding the port that maintains the filter element inside the canister and provides another path for fluid circulation through the filter. The nonmetal components of oil filters typically comprise a filter element and a polymeric gasket. Used oil filters can be delivered to hopper 14 of shredder means 12 in dumpable bins 16 or, alternatively, by any other similarly satisfactory conventional means such as a feed conveyor, overhead storage bin, or the like.

According to a preferred embodiment of the invention, shredder means 12 comprises a hammer mill 18 that performs the functions of (1) tearing open the oil filter canisters to release any flowable used motor oil trapped inside; (2) volume reduction; and (3) particulization of the solid parts of the oil filters into more easily separable pieces of the respective metal and nonmetal components.

Separation of the shredded oil filter parts is preferably accomplished using a conveyor means 20 in combination with a magnetic separation means 22. A satisfactory conveyor means 20 for use in system 10 is an inclined belt conveyor adapted to drain oil 24 released from the shredded oil filters into an oil catch tank 26. Alternatively, a level conveyor means can be utilized in separating oil 24 and oil filter parts 28 provided that it comprises voids, channels or other similarly effective means for draining the flowable oil 24 into catch tank 26.

A preferred magnetic separation means 22 for use with conveyor means 20 is a magnetic head pulley that will maintain ferrous metal parts 30 of oil filters 13 on the surface of the conveyor as shown in FIG. 1 as conveyor belt 32 moves around the pulley. As belt 32 moves off the magnetic pulley on the underside of conveyor means 20, carrying ferrous metal parts 30 out of the magnetic field, ferrous metal parts 30 drop gravitationally into collection means 34. According to a preferred embodiment of the invention, collection means 34 is disposed over oil catch tank 26, and comprises a plurality of drain ports 36 adapted to drain any additional oil 24 that may drip off of ferrous metal parts 30 at that point. It will also be appreciated upon reading this disclosure that other similarly effective means can be used to recover free oil 24 from collection means 34 and/or provide fluid communication with oil catch tank 26.

Nonmetal filter parts 38 will fall off the end of conveyor means 20 into collection means 40 at a trajectory that will depend on the conveyor speed, and the size and geometry of the nonmetal parts. Like collection means 34, collection means 40 is also preferably provided with a plurality of drain ports 44 constructed so as to permit drainage and recovery of any flowable oil 24 without permitting the filter parts to fall through the drain ports.

Collection means 40 is also preferably provided with compaction means 46 that preferably comprises a hydraulic ram adapted to periodically compress nonmetal filter parts 38 into bales. This compaction serves the two-fold purpose of further reducing the volume of nonmetal filter parts 38 and of expressing oil from the absorptive material of the filter element. Any oil 24 expressed during compaction is also preferably recovered in oil catch tank 26.

Through use of the method and apparatus disclosed herein, it is now possible to recycle used oil filters into useful products without environmental contamination. Oil 24 recovered using the method of the invention can be reprocessed and/or refined into other useful hydrocarbon-containing products. Ferrous metal parts 28 can be melted down and reused to make other metal products. Nonmetal parts 38 can be further process to make gaskets, building materials, and the like.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

We claim:

1. A system for recycling oil filters comprising:
   a. means for shredding used oil filters, said filters comprising ferrous metal parts and nonmetal parts, and containing trapped oil, into smaller metal parts and nonmetal parts, and for releasing at least a portion of the trapped oil;
   b. means for separating the released oil from the metal parts and nonmetal parts;
   c. means for separating the metal parts from the nonmetal parts without incineration using gravitational and magnetic means;
   d. means for draining oil from the separated metal parts and nonmetal parts;
   e. means for separately recovering the oil, the metal parts, and the nonmetal parts; and
   f. means for compacting the separated nonmetal parts.

2. The system of claim 1 wherein the means for compacting the separated nonmetal parts comprises a hydraulic ram.

3. A system for recycling oil filters comprising:
   a. means for shredding used oil filters, said filters comprising ferrous metal parts and nonmetal parts, and containing trapped oil, into smaller metal parts and nonmetal parts, and for releasing at least a portion of the trapped oil;
   b. means for separating the released oil from the metal parts and nonmetal parts;
   c. means for separating the metal parts from the nonmetal parts without incineration using gravitational and magnetic means;
   d. means for draining oil from the separated metal parts and nonmetal parts;
   e. means for separately recovering the oil, the metal parts, and the nonmetal parts; and
   f. means for expressing oil from the separated nonmetal parts.

4. A method for recycling used oil filters comprising metal parts and nonmetal parts, and containing trapped oil, the method comprising the steps of:
   a. shredding the filters into smaller metal parts and nonmetal parts, thereby releasing at least a portion of the trapped oil;
   b. separating the released oil from the metal parts and nonmetal parts;
   c. separating the metal parts from the nonmetal parts using gravitational and magnetic means without incineration, and draining the oil therefrom;
   d. compacting the separated nonmetal parts; and
   e. separately recovering the oil, the metal parts and the compacted nonmetal parts.

5. A method for recycling used oil filters comprising metal parts and nonmetal parts, and containing trapped oil, the method comprising the steps of:
   a. shredding the filters into smaller metal parts and nonmetal parts, thereby releasing at least a portion of the trapped oil;
   b. separating the released oil from the metal parts and nonmetal parts;
   c. separating the metal parts from the nonmetal parts using gravitational and magnetic means without incineration, and draining the oil therefrom;
   d. expressing oil from the separated solid nonmetal parts; and
   e. separately recovering the oil, the metal parts and the nonmetal parts.

* * * * *